G. A. LYON.
AUTOMOBILE BUFFER ATTACHER.
APPLICATION FILED APR. 24, 1920.
1,358,689.
Patented Nov. 9, 1920.
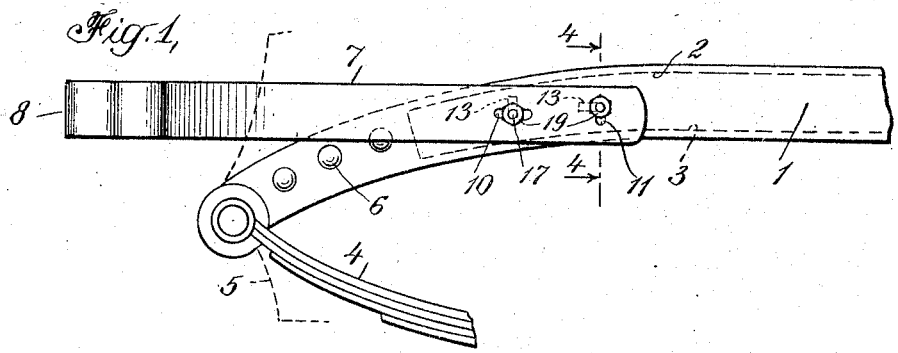
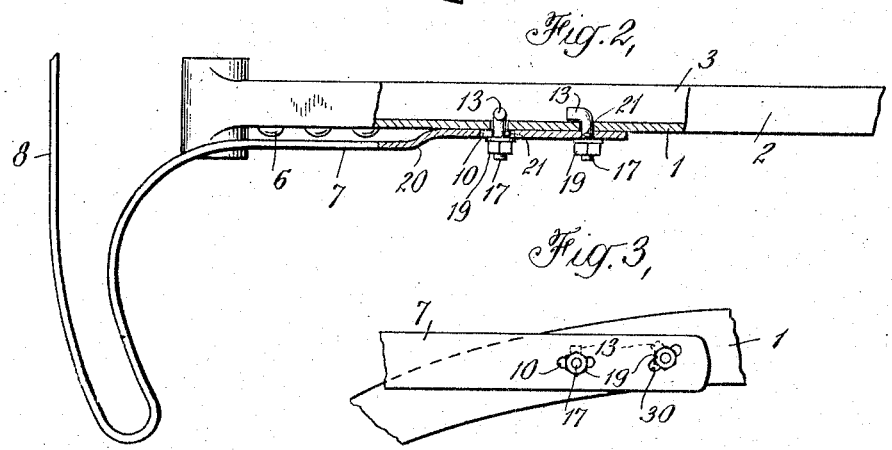
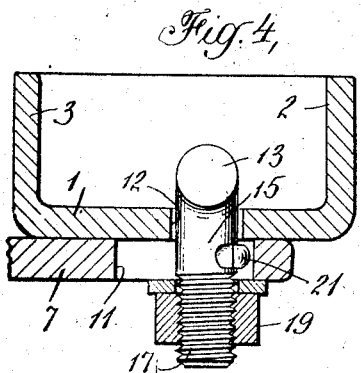
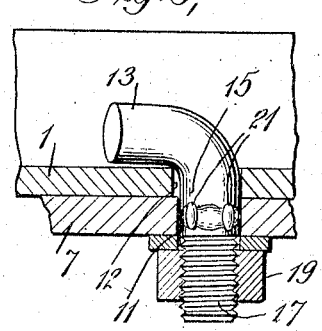
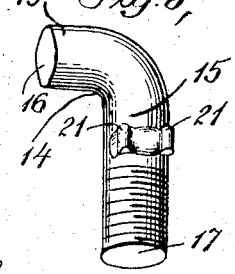
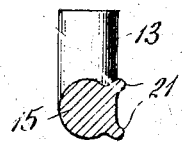
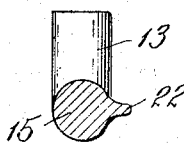
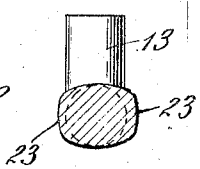
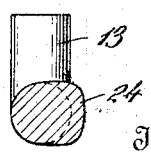
Inventor
George Albert Lyon
By his Attorney
Harry L. Duncan

UNITED STATES PATENT OFFICE.

GEORGE ALBERT LYON, OF PHILADELPHIA, PENNSYLVANIA.

AUTOMOBILE-BUFFER ATTACHER.

1,358,689.          Specification of Letters Patent.     Patented Nov. 9, 1920.

Application filed April 24, 1920. Serial No. 376,297.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile-Buffer Attachers, of which the following is a specification, taken in connection with the accompanying drawing.

This invention relates to angle bolt or alining buffer attachers by which automobile buffers or bumpers or other fittings or attachments having supporting members may be secured or clamped to the apertured frame members of automobiles or other vehicles. When, for instance, the channel frame members of an automobile are formed with several round or other frame apertures at substantially a standard distance apart angle bolt attachers having any suitable bent over or holding ends or contact portions may be inserted into these apertures from the outside of the frame member and then tipped up or turned to bring their bent over or holding ends into laterally projecting position in which they may be retained by the alining action of the bolt stems which may pass through suitable slots or apertures in the supporting members of the automobile buffer or other attachment. The invention in this application which is a continuation in part of my co-pending application, Serial No. 276,899, filed February 14, 1919, relates especially to attachers of this general character in which the attacher stems are formed with rotary alining ribs or projections of any suitable form extending from the attacher stem or shank in a plane substantially perpendicular or at least transverse to the plane of the holding end of the attacher. This construction is especially advantageous when attachers of this type are used in connection with buffer supporting bars or members formed with the usual adjusting slots since the rotary alining projections automatically position the attacher so that its holding end extends in a plane substantially perpendicular or at least transverse to the buffer slot, the sides of which may have a desirable non-tipping alining action on the attacher stem and maintain its bent end in holding position especially if the attacher stem corresponds approximately to the width of the buffer slot. These rotary alining projections or portions may also advantageously act as retainers and regulate the amount to which the attacher ends may be inserted into the frame members, since they may be so positioned on the attacher stems as to prevent undesirable or excessive insertion.

In the accompanying drawing showing in a somewhat diagrammatic way various illustrative embodiments of this invention, Figure 1 is an elevation showing one type of attacher or angle bolt in securing position in connection with an automobile buffer and frame member.

Fig. 2 is a top view partly in section of this arrangement.

Fig. 3 is a partial elevation showing an inclined arrangement of buffer slots.

Fig. 4 is an enlarged transverse view taken substantially along the line 4—4 of Fig. 1.

Fig. 5 is a corresponding sectional view taken in a perpendicular direction.

Fig. 6 is a perspective view showing this form of attacher.

Fig. 7 is a transverse sectional view taken through the attacher shank; and

Figs. 8 to 10 are corresponding sectional views showing other forms of attacher shanks and rotary alining projections.

The automobile or other vehicle buffer or bumper may be of any desired form and construction and may have a resilient or other front portion 8 to which is secured as by the interposed loop the resilient or other supporting member 7 which may in some cases have an offset portion 20 so that these supporting members are carried around any rivets 6 or other projections on the automobile frame. The frame members of the automobile may be of any desired channel iron or angle iron type of construction and as indicated in Figs. 1 and 2 the frame may comprise the web 1 and the integral frame flanges 2, 3 to which the usual mud guards and splash pan 5 may be riveted or otherwise secured, and the rivets 6 may secure to the end of each of these frame members or goose necks the connection for the spring 4 or other part of the automobile. These frame ends may be conveniently formed with circular or other frame apertures, such as 12, which may be punched or otherwise formed in the frame members and located at suitable distances from their ends and preferably at a substantially uniform distance apart so that the attachment of automobile buffers and other fittings may be facilitated.

The spacing of these frame apertures preferably corresponds with the distance between the adjusting slots, holes or other apertures which are formed in the supporting members of automobile buffers of various types and as shown in Fig. 1 the supporting member 7 of the buffer may be formed with adjusting slots 10, 11, although one or more of these slots may be given an obliquely inclined position as in the case of the buffer slot 30 in Fig. 3.

The stems 15 of these angle bolt attachers are preferably of such size as to at least approximately correspond to the width of the adjusting slots or apertures in the automobile buffer or other attachment to be secured to the vehicle and many forms of rotary alining projections may be formed or provided on the attacher stems preferably extending therefrom in a plane substantially perpendicular to or at least transverse to the plane of the bent end or holding portion of the attacher so that these rotary alining projections automatically position the holding end transversely of the plane of the buffer adjusting slot. Figs. 1 to 7 show rotary alining projections 21 which may be in the form of several pinched up or projecting portions 21 which as indicated in Fig. 7 may together constitute a rotary alining projection or member extending transversely from the stem 15 with respect to the holding end 13 so as to coöperate with the buffer slot 11 and insure the substantially transverse or perpendicular positioning of the holding end with respect to this slot. In this way as seen in Fig. 5, the attacher stem 15 which may approximately correspond to the width of the buffer slot 11 is thus quite definitely alined with respect thereto so that when in tight securing position the attacher cannot tip up in such direction as to release the holding end 13 from engagement with the vehicle frame member 1. The thickness of the usual buffer supporting members or bars 7 is considerably greater than that of the frame web 1 used in most automobiles so that the buffer adjusting slots may thus exert a desirable non-tipping alining action on the attachers especially since the attacher stems may fit considerably more closely within these slots than within the frame apertures in which the holding ends 13 of the attachers and their bent portions 14 must be tipped or turned to bring the attachers into holding position. These non-rotary alining projections may also be advantageously positioned on the attacher stem so that they act as retainers in preventing the undesirable or excessive insertion of the attacher into the vehicle frame member, and as shown in Figs. 4, 5 and 6 these alining projections 21 may be formed or arranged on the attacher stem so as to engage the outer surface of the frame member 1 and prevent further insertion of the attacher when the attacher end and stem have been sufficiently inserted into the frame member. When, for example, one or more such attachers have been inserted in each frame member and tipped or turned around so as to bring their stems substantially into securing position they naturally remain in approximately such position so that the coöperating supporting members of the automobile buffer or other attachment may be put in place and the apertures or adjusting slots 10, 11 brought into engagement with the projecting stems of the attachers without any great difficulty. This work can thus be done not only by the ordinary garage man but also by the automobile owner himself which is quite desirable in many cases.

The alining stems 15 of these attachers or angle bolts may be formed with any desired type of fastening device, such as the threaded portions 17 and in addition to the alining action secured between these attacher stems and the buffer adjusting slots or other apertures additional non-tipping alining action may be secured by the coöperating fastening means, such as the washers or nuts 19 which may also with advantage fit tightly enough and have their inner faces trued up sufficiently to exert considerable alining action in connection with coöperating parts or faces against which they are secured when the nuts are tightened on the alining stems of the angle bolts or attachers. This tightening action brings the holding or contact portion of the angle bolt into tight holding engagement with the inner side of the frame web or member preferably closely adjacent the frame aperture, for which reason the holding end 13 of the attacher is made relatively short as indicated, the tip 16 of this holding end extending from the attacher stem in some cases no more than about the diameter of the stem. This strengthens the holding end against bending strains and also has the advantage of preventing its undesirable contact with the frame flanges so as to interfere with the desired positioning of the attacher. Of course where in special cases the frame apertures are formed adjacent one of the frame flanges the attacher may be inserted and alined in connection with the coöperating parts so that its holding end projects away from and not toward the adjacent frame flange, there being of course two allowable positions of the attacher end, either one of which may be chosen when the attacher is inserted.

Fig. 8 shows another form of rotary alining projection 22 which may as indicated consist of a single pinched up portion or projection pinched up or otherwise formed from the material of the attacher stem 15 and projecting therefrom in a transverse direction with respect to the holding end 13 of the attacher. This alining projection thus insures the substantial or approximately transverse positioning of the holding end 13 with respect to the buffer adjusting slot through which the attacher stem may be inserted so that their substantial advantages may be secured along the lines previously referred to. Fig. 9 shows several rotary alining projections 23 which may be formed on the attacher stem in such position as to coöperate with the adjusting slot of a buffer supporting member or bar and since these alining projections are as indicated substantially perpendicular to the plane of the holding end 13 of the attacher this holding end is automatically transversely positioned with respect to the buffer adjusting slot with which this attacher stem engages. Such rotary alining projections may be formed on the stem of the angle bolt or attacher in any suitable way, as for instance, by drop forging methods which may be used to give the holding end or other parts of the attacher any desired special shape. Fig. 10 shows another form of rotary alining projection 25 which may be similarly formed on the attacher stem so as to project transversely to the holding end 13 of the attacher and thus position this holding end with respect to the buffer adjusting slot through which the attacher stem and its integral alining projection may extend. A single full width or integral alining projection of this character is in some respects preferable to the double alining projection shown in Fig. 9 since when the attacher stem has only a single projection it may fit somewhat closer to the end of an adjusting slot so as to give full range of adjustment to the coöperating buffer or other vehicle attachment.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims:

1. In attaching devices adapted for use in securing an automobile buffer to an automobile having flanged frame members provided with frame apertures, a one-piece bolt attacher having a threaded alining stem adapted to extend through an adjusting slot in the supporting member of the buffer and having a laterally projecting holding end adapted to be inserted through one of the frame apertures from the outside of the frame member and a pinched up rotary alining projection on the attacher stem and projecting therefrom transversely with respect to said holding end to position said holding end transversely with respect to the adjusting slot through which the attacher stem extends.

2. In attaching devices adapted for use in securing an automobile buffer to an automobile having flanged frame members provided with frame apertures, a bolt attacher having an alining stem adapted to extend through an adjusting slot in the supporting member of the buffer and having a laterally projecting holding end adapted to be inserted through one of the frame apertures from the outside of the frame member and a pinched up alining projection on the attacher stem and projecting therefrom transversely with respect to said holding end.

3. In attaching devices adapted for use in securing an automobile buffer or other attachment to an automobile having flanged frame members provided with frame apertures, a one-piece bolt attacher having an alining stem adapted to extend through an adjusting slot in the attachment and having a laterally projecting holding end adapted to be inserted through one of the frame apertures from the outside of the frame member and a rotary alining projection on the attacher stem and projecting therefrom in a plane transverse with respect to said holding end to position said holding end transversely with respect to the adjusting slot through which the attacher stem extends.

4. In attaching devices adapted for use in securing an automobile buffer or other attachment to an automobile having flanged frame members provided with frame apertures, a one-piece attacher having an alining stem adapted to extend through an adjusting slot in the attachment and having a laterally projecting holding end adapted to be inserted through one of the frame apertures from the outside of the frame member and a rotary projection on the attacher stem and projecting therefrom transversely with respect to said holding end to position said holding end transversely with respect to the adjusting slot through which the attacher stem extends.

5. In attaching devices adapted for use in securing an automobile buffer or other attachment to an automobile having flanged frame members provided with frame apertures, a bolt attacher having an alining stem adapted to extend through an adjusting slot in the attachment and be alined by the sides of said slot and having a laterally projecting holding end adapted to be inserted through one of the frame apertures from the outside of the frame member and a rotary alining projection on the attacher stem preventing its undesirable insertion and projecting therefrom transversely with respect to said holding end to position said holding end transversely with respect to the adjusting slot through which the attacher stem extends.

6. In attaching devices adapted for use in securing an automobile buffer or other attachment to an automobile having flanged frame members provided with frame apertures, an attacher having an alining stem adapted to extend through an adjusting slot in the attachment and having a laterally projecting holding end adapted to be inserted through one of the frame apertures from the outside of the frame member and an alining projection on the attacher stem and projecting therefrom transversely with respect to said holding end.

7. In attaching devices adapted for use in attaching an automobile buffer to an automobile having flanged frame members provided with spaced frame apertures, a plurality of one-piece angle bolt attachers having threaded stems and laterally projecting holding portions adapted to be inserted into said apertures from the outside of said frame members and rotary alining projections on the stems of said apertures in such position as to prevent undesirable insertion thereof into said frame members and each extending from the attacher stem in a plane substantially perpendicular to the connected holding portions of the attachers to aline said holding portions transversely with respect to the buffer adjusting slot through which the attacher stem passes and to prevent undesirable rotation of the attacher during the tightening thereof.

8. In attaching devices adapted for use in attaching an automobile buffer to an automobile having flanged frame members provided with spaced frame apertures, a plurality of angle bolt attachers having threaded stems and laterally projecting holding portions adapted to be inserted into said apertures from the outside of said frame members and rotary alining projections on the stems of said apertures in such position as to prevent undesirable insertion thereof into said frame members and each extending from the attacher stem in a plane substantially transverse to the connected holding portions of the attachers to aline said holding portions transversely with respect to the buffer adjusting slot through which the attacher stem passes and to prevent undesirable rotation of the attacher during the tightening thereof.

9. In automobile buffers, an automobile having flanged frame members each provided with a plurality of spaced frame apertures, a splash pan coöperating with the inner sides of said frame members, a buffer having supporting members formed with adjusting slots and adapted to coöperate with said frame members and angle bolt attachers having stems substantially corresponding to the width of said adjusting slots and having transversely extending holding ends adapted to be inserted through said frame apertures from the outer sides of said frame members and rotary alining projections on the stems of said attachers in such position as to prevent undesirable insertion of the attachers and extending in planes substantially perpendicular to the corresponding holding ends and adapted to position said holding ends in planes substantially perpendicular to the coöperating buffer adjusting slots so that the sides of said slots are enabled to exert non-tipping alining action on the attacher stems and prevent undesirable rotation of the attachers during the tightening thereof.

10. In automobile buffers, an automobile having flanged frame members provided with frame apertures, a splash pan coöperating with the inner sides of said frame members, a buffer having supporting members formed with adjusting slots and adapted to coöperate with said frame members and angle bolt attachers having stems substantially corresponding to the width of said adjusting slots and having transversely extending holding ends adapted to be inserted through said frame apertures from the outer sides of said frame members and rotary alining projections on the stems of said attachers extending in planes substantially to the corresponding holding ends and adapted to position said holding ends in planes substantially transverse to the coöperating buffer adjusting slots so that the sides of said slots are enabled to prevent undesirable rotation of the attachers during the tightening thereof.

GEORGE ALBERT LYON.